E. V. BRAY.
SEPARATOR FOR REMOVING GAS FROM OIL OR OTHER LIQUIDS.
APPLICATION FILED MAR. 25, 1911.
1,014,943.
Patented Jan. 16, 1912.
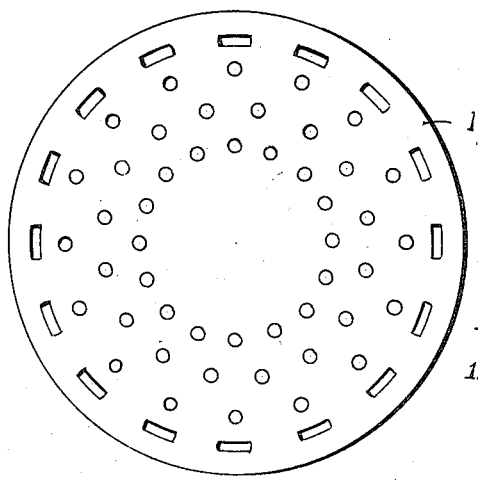
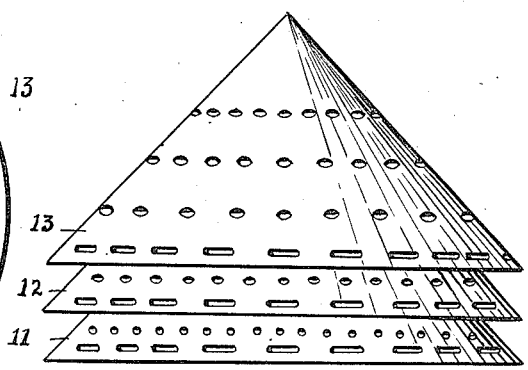
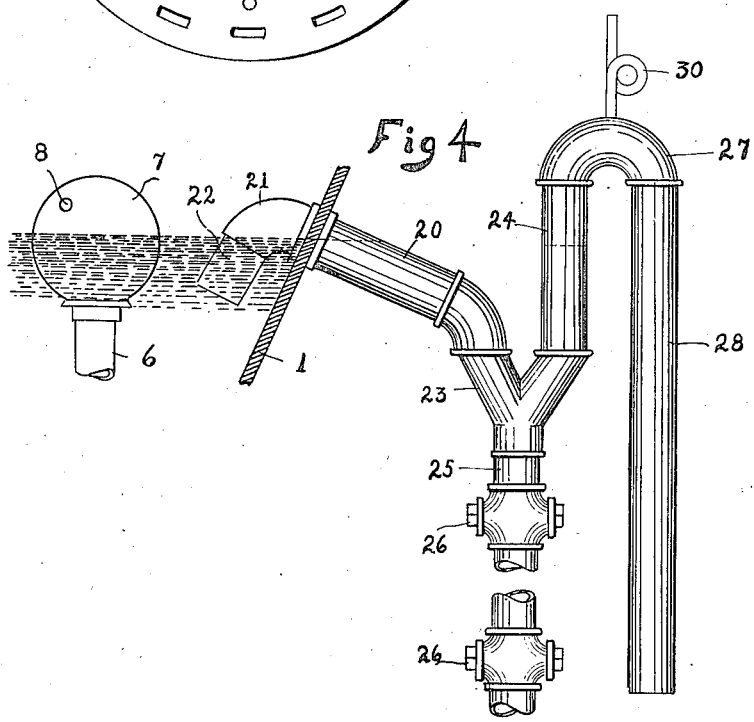
WITNESSES
H. B. Clark
B. M. Freund
INVENTOR
E. V. Bray
BY
Carlos P. Griffin
ATTORNEY

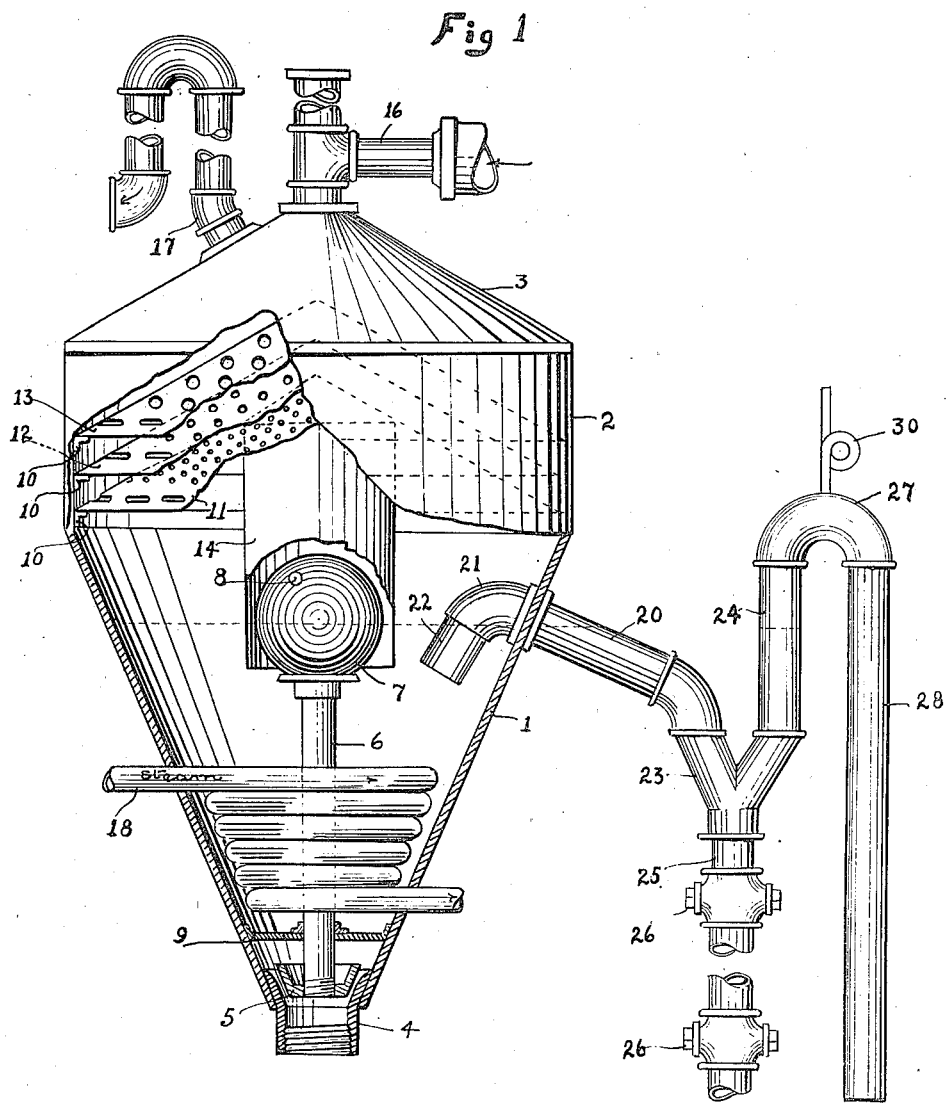

UNITED STATES PATENT OFFICE.

EUSTACE VIVIAN BRAY, OF COALINGA, CALIFORNIA, ASSIGNOR OF ONE-HALF TO RICHARD S. HASELTINE, OF COALINGA, CALIFORNIA.

SEPARATOR FOR REMOVING GAS FROM OIL OR OTHER LIQUIDS.

1,014,943.      Specification of Letters Patent.      Patented Jan. 16, 1912.

Application filed March 25, 1911. Serial No. 616,975.

*To all whom it may concern:*

Be it known that I, EUSTACE V. BRAY, citizen of the United States, residing at Coalinga, in the county of Fresno and State of California, have invented a new and useful Separator for Removing Gas from Oil or other Liquids, of which the following is a specification in such full and clear terms as will enable those skilled in the art to construct and use the same.

This invention relates to an apparatus for the purpose of the removal and the collection of gas from crude oil or other liquid.

It will be understood by those skilled in the art that crude oil and other liquids as they come from the ground and some other liquids, contain considerable quantities of combustible gas. This gas is ordinarily permitted to escape and waste. However, the quantity of gas in some oils and liquids is so considerable as to make this a serious waste, and to prevent this waste, this apparatus has been designed. After the gas is separated from the oil or other liquids and has been collected, it may be burned under the boiler supplying steam to an oil pump used in a gas engine or for heating and lighting, or it may be used at any other suitable place where power is desired, thus effecting a considerable economy in power.

In the drawings in which the same numeral of reference is applied to the same portion throughout the several views, Figure 1 is a view partly in section of the gas separator, Fig. 2 is a plan view of the top separating screen, Fig. 3 is a side elevation of the three separating screens used, and Fig. 4 is a view illustrating the overflow pipe.

The numeral 1 represents a conical casing having a cylindrical extension 2, the top of which is closed by means of the cylindrical cone 3. At the bottom of the cone 1, there is a sleeve 4, within which a valve or stopper 5 seats. The valve 5 is screwed on the lower end of a pipe 6, to which pipe is secured a float 7, the latter having an opening 8 therein for a purpose to be explained. Near the bottom of the casing 1, there is a guide plate 9 to prevent the valve from working out of line with the sleeve 4.

The cylindrical casing 2 is provided with a series of brackets 10, there being a number of said brackets at different levels to support the three screens 11, 12, and 13, the latter screen having larger openings therein than the lower screen. The lowest screen has a cylindrical casing 14 secured thereto, which extends downwardly over the float 7, the object being to prevent the incoming oil or liquid from flowing down over the top of the float and accumulating sand and foreign matter thereon, thus preventing its free action.

The oil or liquid is fed into the casing through the pipe 16 at the top of the cone 3, and the gas is removed therefrom through the pipe 17 at the side of the pipe 16. Since heavy fuel oil is more or less viscous, it becomes necessary to provide means to heat the same, a better separation of the gas being effected when the oil is hot. The steam coil also by its heat can cause possibly a greater liberation of gas. This means comprises a coil of pipe 18 at the bottom of the cone 1. In operation the oil or liquid is forced into the apparatus through the pipe 16, one of the openings in said pipe being closed, or both receiving oil or liquid from different sources of supply. The oil or liquid then passes down over the screens and into the cone 1, filling the latter until the float 7 lifts the valve 5 enough to permit such a quantity of oil or liquid to escape as will again seat the valve, or it may be that the valve will be open continuously. However, since the only escape for the gas is through the pipe 17, it may be collected in a suitable receptacle, or may be run to a furnace to be burned, or used in some metallurgical or chemical process, or in the arts.

In order to insure against oil or liquid leaking into the float and interfering with the operation thereof, the pipe 6 is opened to the oil drain pipe, thus permitting the escape of any oil should the float leak, or should the casing 1 be unduly filled, the oil or liquid might run through the opening 8 to the main pipe line.

Since considerable sand or other foreign matter is usually brought along with the oil or liquid, it becomes necessary to provide some means for insuring the continuous operation of the separator should the sand or foreign matter become so great in quantity as to close up the valve 5 and prevent the escape of oil therefrom. This means comprises a pipe 20 connected to the cone 1 and having a downwardly extending elbow 21 and short nipple 22. This pipe is turned downwardly at this point to prevent the sand or other foreign matter from passing thereinto, as much as may be possible in order to keep its inlet free. It is connected with a Y 23, which has a pipe 24 connected therewith at one upper opening, and a pipe 25 connected therewith at the bottom, the latter having suitable valves 26 for the regulation of the escape of sand or other foreign matter therefrom, since more or less sand is suspended in the oil or other liquid at all times. The pipe 24 extends somewhat above the desired level of the liquid in the casing 1, and it is provided with a return bend 27 to which the pipe 28 is secured, the return bend 27 having a vent pipe 30 to prevent siphoning of the oil or liquid.

It will be noted that in order to insure continuous operation in the use of this apparatus as a separator of gas from liquids containing considerable quantities of sand, it is very essential to use a casing with a conical bottom in order that the sand may be discharged with the liquid without completely filling the casing.

Having thus described my invention what I claim as new and desire to secure by Letters Patent of the United States is as follows:

1. In an apparatus for the separation of gas from liquid, a casing having an opening at the bottom thereof, a supply pipe therefor, screens in said casing upon which the liquid impinges, a gas outlet pipe for said casing, an inner casing below the screens, a float movable in said inner casing, a valve in the opening in the bottom of said outer casing, and a hollow stem connecting said valve and said float, said float having an opening therein through which the liquid may overflow should the float fail to raise the valve, as set forth.

2. In an apparatus for the removal of gas from liquid, a casing, a plurality of conical screens therein, a second casing within the first casing below the screens thereof, an inlet pipe above the screens, a gas outlet pipe above said screens, a float movable in said inner casing, a valve closing the opening at the bottom of the outer casing, and a stem connecting said float and valve, as set forth.

3. In an apparatus for the separation of gas from liquid, a casing, a supply pipe therefor, screens in said casing upon which the liquid impinges, a gas outlet pipe for said casing, an inner casing below the screens, a float movable in said inner casing, a valve in the opening in the bottom of said outer casing, a hollow stem connecting said valve and said float, said float having an opening therein through which liquid may overflow should the float fail to raise the valve, and a steam coil within the outer casing to heat the liquid therein, as set forth.

4. In an apparatus for the removal of gas from liquid, a casing having an opening at the bottom thereof, a supply pipe at the top of the casing, a plurality of conical screens therein, a second casing within the first casing below the screens thereof, an inlet pipe above the screens, a gas outlet pipe above said screens, a float movable in said inner casing, a valve closing the opening at the bottom of the outer casing, a stem connecting said float and valve, and an outlet pipe having a trap therein connected with the outer casing to discharge oil should the quantity thereof fed to the separator be too great to pass off through the opening in the bottom of the casing, as set forth.

5. In an apparatus for the removal of gas from liquid, a casing having a conical bottom, a plurality of conical screens in said casing, an inlet pipe above the screens, a gas outlet pipe above said screens, a float below said screens, a valve at the bottom of the conical casing, and a stem connecting said valve and float whereby liquid will be permitted to escape from the casing upon filling the same with liquid to the float, as set forth.

In testimony whereof I have hereunto set my hand this 1st day of March A. D. 1911, in the presence of the two subscribed witnesses.

EUSTACE VIVIAN BRAY.

Witnesses:
H. R. Crozier,
William H. Satchell.